(12) United States Patent
Brehob

(10) Patent No.: US 7,287,509 B1
(45) Date of Patent: Oct. 30, 2007

(54) DIRECT INJECTION ALCOHOL ENGINE WITH VARIABLE INJECTION TIMING

(75) Inventor: Diana Brehob, Dearborn, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 11/464,168

(22) Filed: Aug. 11, 2006

(51) Int. Cl.
*F02M 25/00* (2006.01)

(52) U.S. Cl. ............... 123/299; 123/1 A; 123/25 C; 123/25 E

(58) Field of Classification Search ............ 123/299, 123/300, 1 A, 25 C, 25 E; 701/105
See application file for complete search history.

(56) References Cited

U.S. PATENT DOCUMENTS

| | | | |
|---|---|---|---|
| 4,817,576 A | 4/1989 | Abe et al. | |
| 4,945,881 A | 8/1990 | Gonze et al. | |
| 5,018,483 A | 5/1991 | Kashima et al. | |
| 5,044,344 A | 9/1991 | Tuckey et al. | |
| 5,056,490 A | 10/1991 | Kashima | |
| 5,056,494 A | 10/1991 | Kayanuma | |
| 5,111,795 A | 5/1992 | Thompson | |
| 5,131,228 A | 7/1992 | Mochizuki et al. | |
| 5,231,969 A * | 8/1993 | Suga ................... | 123/1 A |
| 5,233,944 A | 8/1993 | Mochizuki | |
| 5,335,637 A | 8/1994 | Davis et al. | |
| 5,408,979 A | 4/1995 | Backlund et al. | |
| 5,477,836 A | 12/1995 | Hyodo et al. | |
| 5,782,092 A | 7/1998 | Schultalbers et al. | |
| 5,806,500 A | 9/1998 | Fargo et al. | |
| 6,502,543 B1 | 1/2003 | Arai et al. | |
| 6,845,616 B2 | 1/2005 | Jauss | |
| 6,866,012 B2 | 3/2005 | Hayase et al. | |
| 7,159,568 B1 * | 1/2007 | Lewis et al. ............ | 123/299 |
| 2003/0089337 A1 | 5/2003 | Cohn et al. | |
| 2004/0035395 A1 | 2/2004 | Heywood et al. | |
| 2004/0065274 A1 | 4/2004 | Cohn et al. | |
| 2005/0051135 A1 | 3/2005 | Tomada et al. | |
| 2005/0097888 A1 | 5/2005 | Miyashita | |
| 2005/0109316 A1 | 5/2005 | Oda | |
| 2005/0109319 A1 | 5/2005 | Oda | |
| 2005/0155577 A1 | 7/2005 | Ichise et al. | |
| 2005/0155578 A1 | 7/2005 | Ichise et al. | |
| 2005/0166896 A1 | 8/2005 | Sadakane | |
| 2005/0172931 A1 | 8/2005 | Mori | |

(Continued)

OTHER PUBLICATIONS

Hunter, M. Park, "1962 Oldsmobile Jetfire," orginally appeared in Special Interest Autos, Apr. 1996, http://www.tctc.com/~park/mph/pageCLIP/page62JET/62jet.htm, Nov. 7, 2006.

(Continued)

*Primary Examiner*—Erick Solis
(74) *Attorney, Agent, or Firm*—Allan J. Lippa; Alleman Hall McCoy Russell & Tuttle LLP

(57) ABSTRACT

A method to control injection timing for an internal combustion engine having a plurality of injectors in at least a cylinder, the method comprising of directly injecting a fuel to at least a cylinder of an internal combustion engine, and adjusting a timing and number of injections as an alcohol amount in the fuel varies.

20 Claims, 5 Drawing Sheets

U.S. PATENT DOCUMENTS

| | | |
|---|---|---|
| 2005/0178356 A1 | 8/2005 | Shibagaki |
| 2005/0178360 A1 | 8/2005 | Satou |
| 2006/0075991 A1 | 4/2006 | Heywood et al. |
| 2006/0102136 A1 | 5/2006 | Bromberg et al. |
| 2006/0102145 A1 | 5/2006 | Cohn et al. |
| 2006/0102146 A1 | 5/2006 | Cohn et al. |
| 2007/0044753 A1* | 3/2007 | Brehob ..................... 701/105 |

OTHER PUBLICATIONS

Vance, Bill, "Turbocharger Boosted Engine's Efficiency: Developed to maintain high-altitude performance," for the Calgary Herald Edmonton, http://www.ucalgary.ca/~csimpson/Articles/JetFire.html, Nov. 7, 2006.

Stephen Russ, "A Review of the Effect of Engine Operating Conditions on Borderline Knock", SAE Technical Paper Series 960497, Feb. 26-29, 1996.

S. Brusca et al., "Water Injection in IC-SI Engines to Control Detonation and to Reduce Pollutant Emissions", SAE Technical Paper No. 2003-01-1912, May 19-22, 2003.

D.R. Cohn et al., "Direct Injection Ethanol Boosted Gasoline: Biofuel Leveraging for Cost Effective Reduction of Oil Dependence and CO2 Emissions", Mar. 15, 2005, Massachusetts Institute of Technology.

L. Bromberg et al., "Calculations of Knock Supperssion in Highly Turbocharged Gasoline/Ethanol Engines Using Direct Ethanol Injection", Jul. 7, 2005, Massachusetts Institute of Technology.

* cited by examiner

DIRECT INJECTION ALCOHOL ENGINE WITH VARIABLE INJECTION TIMING

BACKGROUND AND SUMMARY

Alternate fuels have been identified to mitigate the rising price of conventional energy sources and environmental concerns. For example, alcohol has been recognized as an attractive alternative source of energy, and more particularly a fuel for automotive applications. Various engine systems may be used with alcohol fuels, utilizing various engine technologies such as turbo-chargers, super-chargers, etc. Further, various approaches may be used to control alcohol-fuelled engines with such devices, including adjustment of boost or spark timing in dependence upon an alcohol content of the engine fuel, and various operating conditions.

The inventors herein have recognized several interrelated issues with alcohol-fuelled engines involving the fuel delivery system, and found that it is possible to operate the engine system to achieve improved engine performance with an alcohol fuel or blend by varying the amounts, timing, and/or number of injections in a cycle.

In this way, it is possible to utilize direct injection, along with an appropriate boost, spark, and fuel control system, to take advantage of increased charge cooling effects via alcohol's higher heat of vaporization and increased octane to provide an engine with improved peak torque output and/or emission performance.

DETAILED DESCRIPTION

Figure 1:
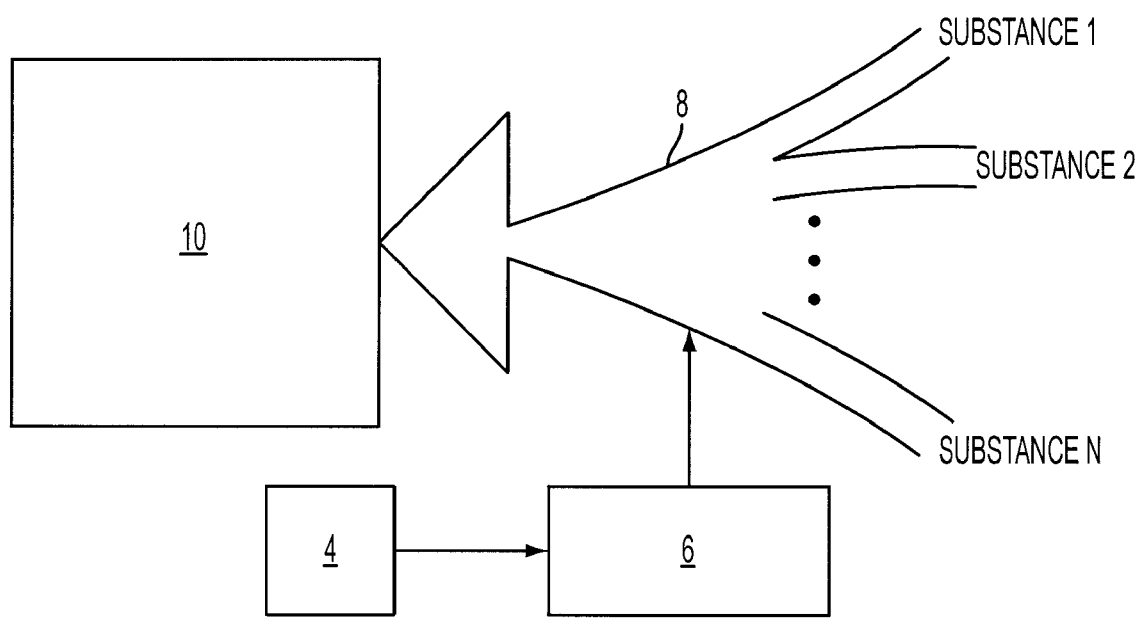
FIG. 1 shows a generic engine system.

FIG. 1 shows an engine 10 receiving delivery of a plurality of substances (1, 2, . . . , N) via arrow 8. The various substances may include multiple different fuel blends or other alternatives. In one example, multiple different substances having different gasoline and/or alcohol and/or water concentrations may be delivered to the engine, and may be delivered in a mixed state, or separately delivered. Further, the relative amounts and/or ratios of the different substances provided may be controlled by a controller 6 in response to operating conditions, which may be provided and/or inferred via sensor(s) 4. Alternatively, or under some conditions, the relative amounts and/or ratios may be determined by the fuel blend added to the vehicle by the customer, and thus may not significantly vary during operation.

In one example, the different substances may represent different fuels having different levels of alcohol, including one substance being gasoline and the other being ethanol. In another example, engine 10 may use gasoline as a first substance and an alcohol containing fuel such as ethanol, methanol, a mixture of gasoline and ethanol (e.g., E85 which is approximately 85% ethanol and 15% gasoline), a mixture of gasoline and methanol (e.g., M85 which is approximately 85% methanol and 15% gasoline), a mixture of an alcohol and water, a mixture of an alcohol, water, and gasoline, etc as a second substance. In still another example, the first substance may be a gasoline alcohol blend with a lower alcohol concentration than a gasoline alcohol blend of a second substance.

In one embodiment, when using both gasoline and a fuel having alcohol (e.g., ethanol), it may be possible to adjust operating conditions to take advantage of the increased charge cooling of alcohol fuels (e.g., via direct injection) to provide improved engine performance, because of the different properties of alcohol. This phenomenon, combined with increased compression ratio, and/or boosting and/or engine downsizing, can then be used to obtain fuel economy benefits (by reducing the knock limitations on the engine), while also allowing engine operation with improved engine output torque, for example.

Figure 2:
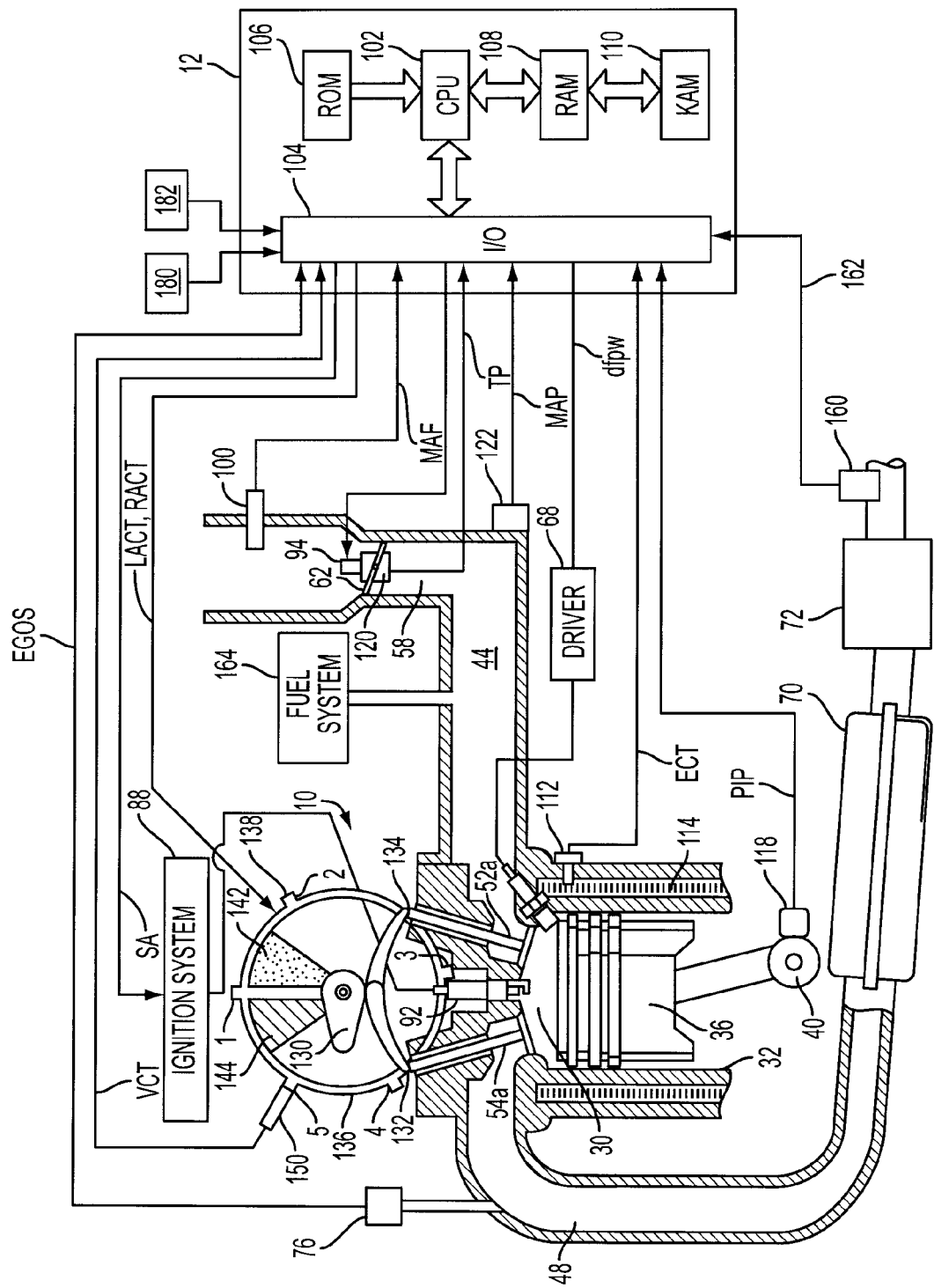
FIG. 2 shows a partial engine view.

Referring now to FIG. 2, one cylinder of a multi-cylinder engine, as well as the intake and exhaust path connected to that cylinder, is shown. In the embodiment shown in FIG. 2, engine 10 uses a direct injector 66. Further, engine 10 is capable of using a plurality of different fuel blends. For example, engine 10 may use a mixture of gasoline and an alcohol containing fuel such as ethanol, methanol, a mixture of gasoline and ethanol (e.g., E85 which is approximately 85% ethanol and 15% gasoline), a mixture of gasoline and methanol (e.g., M85 which is approximately 85% methanol and 15% gas), etc. Direct injector 66 may be used to inject a mixture gasoline and such an alcohol based fuel, where the ratio of the two fuel quantities in the mixture may be adjusted by controller 12 via a mixing valve, for example. In another embodiment, different sized injectors and different fuels may be used.

FIG. 2 also shows a direct injection system, where engine 10 has spark ignition. Internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) may be coupled to crankshaft 40 via a flywheel (not shown), or alternatively direct engine starting may be used.

In one particular example, piston 36 may include a recess or bowl (not shown) to help in forming stratified charges of air and fuel, if desired. However, in an alternative embodiment, a flat piston may be used.

Combustion chamber, or cylinder, 30 is shown communicating with intake manifold 44 and exhaust manifold 48 via respective intake valves 52*a* and 52*b* (not shown), and exhaust valves 54*a* and 54*b* (not shown). Thus, while four valves per cylinder may be used, in another example, a single intake and single exhaust valve per cylinder may also be used. In still another example, two intake valves and one exhaust valve per cylinder may be used.

Combustion chamber 30 can have a compression ratio, which is the ratio of volumes when piston 36 is at bottom center to top center. Conventionally, the compression ratio is in the range of 9:1 to 10:1 However, when higher octane fuels, fuels with a higher latent enthalpy of vaporization, and/or direct injection is used, the compression ratio can be raised due to the mitigating effects that octane, latent enthalpy of vaporization, and direct injection have on knock.

Fuel injector 66 is shown directly coupled to combustion chamber 30 for delivering injected fuel directly therein in proportion to the pulse width of signal dfpw received from controller 12 via electronic driver 68. While FIG. 2 shows injector 66 as a side injector, it may also be located overhead of the piston, such as near the position of spark plug 92. Such a position may improve mixing and combustion due to the lower volatility of some alcohol based fuels. Alternatively, the injector may be located overhead and near the intake valve to improve mixing. Additional fuel injectors may also be used.

Fuel and/or water may be delivered to fuel injector 66 by a high pressure fuel system (not shown) including a fuel tank, fuel pumps, and a fuel rail. Alternatively, fuel and/or water may be delivered by a single stage fuel pump at lower pressure, in which case the timing of the direct fuel injection may be more limited during the compression stroke than if a high pressure fuel system is used. Further, while not shown, the fuel line may have a pressure transducer providing a signal to controller 12.

Intake manifold 44 is shown communicating with throttle body 58 via throttle plate 62. In this particular example, throttle plate 62 is coupled to electric motor 94 so that the position of elliptical throttle plate 62 is controlled by controller 12 via electric motor 94. This configuration may be referred to as electronic throttle control (ETC), which can also be utilized during idle speed control. In an alternative embodiment (not shown), a bypass air passageway is arranged in parallel with throttle plate 62 to control inducted airflow during idle speed control via an idle control by-pass valve positioned within the air passageway. In the latter alternative, throttle plate 62 is actuated by the operator of the vehicle, the cable, or other device, between the accelerator pedal and the throttle valve not shown.

Exhaust gas sensor 76 is shown coupled to exhaust manifold 48 upstream of catalytic converter 70 (where sensor 76 can correspond to various different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric, homogeneous mode of operation.

Distributorless ignition system 88 provides ignition spark to combustion chamber 30 via spark plug 92 in response to spark advance signal SA from controller 12.

Controller 12 may cause combustion chamber 30 to operate in a variety of combustion modes, including a homogeneous air/fuel mode and/or a stratified air/fuel mode by controlling injection timing, injection amounts, spray patterns, etc. Further, combined stratified and homogenous mixtures may be formed in the chamber. In one example, stratified layers may be formed by operating injector 66 during a compression stroke. In another example, a homogenous mixture may be formed by operating injector 66 during an intake stroke (which may be open valve injection). In yet another example, a homogenous mixture may be formed by operating injector 66 before an intake stroke (which may be closed valve injection). In still other examples, multiple injections from injector 66 may be used during one or more strokes (e.g., intake, compression, exhaust, etc.). Even further examples may be where different injection timings and mixture formations are used under different conditions, as described below.

Controller 12 can adjust the amount of fuel delivered by fuel injector 66 so that the homogeneous, stratified, or combined homogenous/stratified air/fuel mixture in chamber 30 can be selected to be at stoichiometry, a value rich of stoichiometry, or a value lean of stoichiometry.

Emission control device 72 is shown positioned downstream of catalytic converter 70. Emission control device 72 may be a three-way catalyst, particulate filter, NOx trap, or combinations thereof.

Controller 12 is shown as a microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; absolute manifold pressure signal MAP from sensor 122; an indication of knock from knock sensor 182; and an indication of absolute or relative ambient humidity from sensor 180. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft.

Continuing with FIG. 2, a variable camshaft timing system is shown. Specifically, camshaft 130 of engine 10 is shown communicating with rocker arms 132 and 134 for actuating intake valves 52a, 52b and exhaust valves 54a, 54b. Camshaft 130 is directly coupled to housing 136. Housing 136 forms a toothed wheel having a plurality of teeth 138. Housing 136 is hydraulically coupled to crankshaft 40 via a timing chain or belt (not shown). Therefore, housing 136 and camshaft 130 rotate at a speed substantially equivalent to the crankshaft. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b, and exhaust valves 54a, 54b open and close at a time later than normal relative to crankshaft 40.

While this example shows a system in which the intake and exhaust valve timing are controlled concurrently, variable intake cam timing, variable exhaust cam timing, dual independent variable cam timing, or fixed cam timing may be used. Further, variable valve lift may also be used. Further, camshaft profile switching may be used to provide a plurality (usually two) cam profiles which can be selected based on operating conditions. Further still, the valvetrain may be roller finger follower, direct acting mechanical bucket, electromechanical, electrohydraulic, or other alternatives to rocker arms.

Continuing with the variable cam timing system, teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another) while tooth 5 is preferably used for cylinder identification, as described later herein. In addition, controller 12 sends control signals (LACT, RACT) to conventional solenoid valves (not shown) to control the flow of hydraulic fluid either into advance chamber 142, retard chamber 144, or neither.

Relative cam timing can be measured in a variety of ways. In general terms, the time, or rotation angle, between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

Sensor 160 may also provide an indication of oxygen concentration in the exhaust gas via signal 162, which provides controller 12 a voltage indicative of the O2 concentration. For example, sensor 160 can be a HEGO, UEGO, EGO, or other type of exhaust gas sensor. Also note that, as described above with regard to sensor 76, sensor 160 can correspond to various different sensors.

As described above, FIG. 2 merely shows one cylinder of a multi-cylinder engine, and it is understood that each cylinder has its own set of intake/exhaust valves, fuel injectors, spark plugs, etc.

Figure 3:
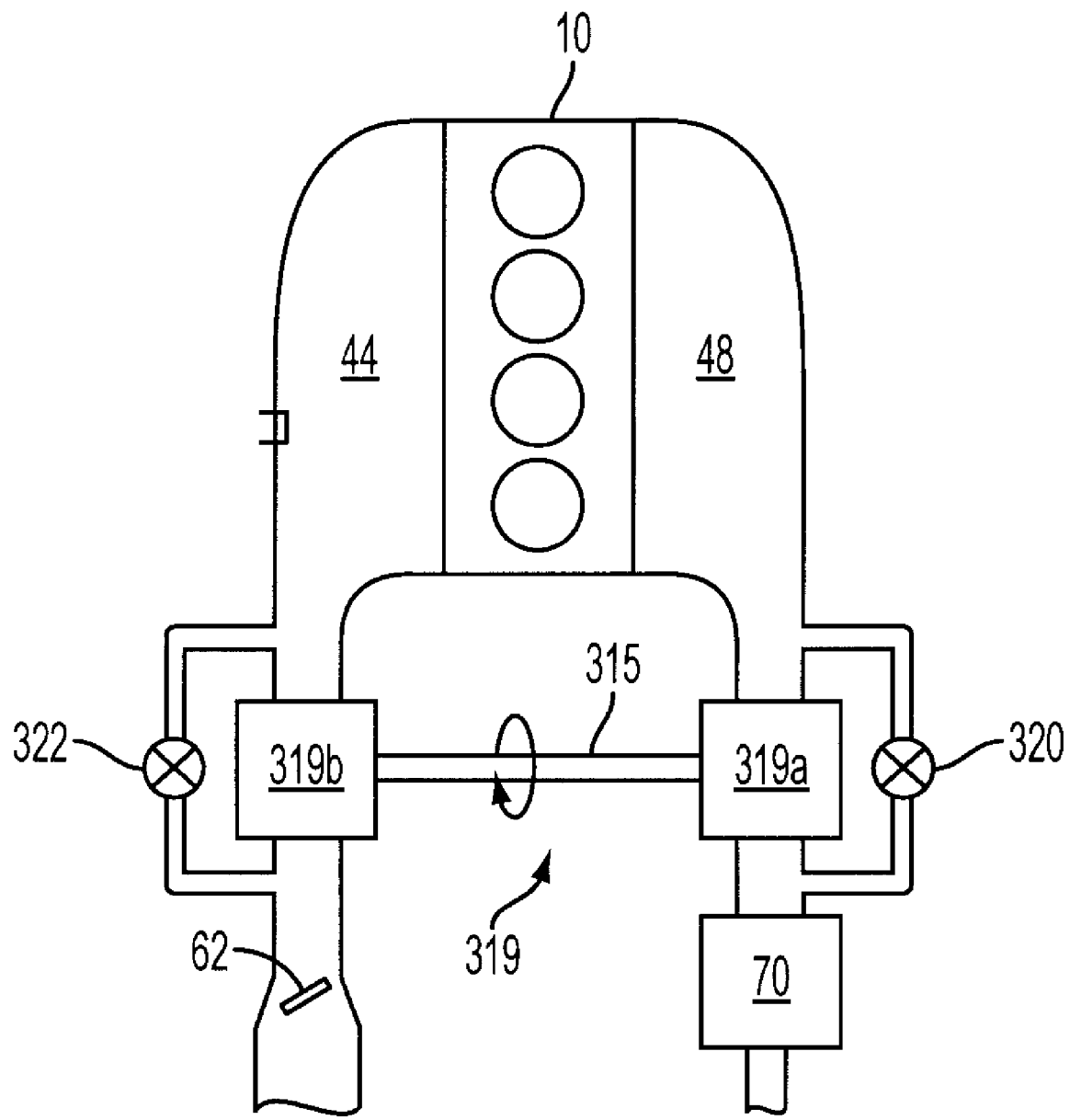
FIG. 3 shows an engine with a turbocharger.

While not shown in FIG. 2, engine 10 may be coupled to various boosting devices, such as a supercharger or turbocharger, as shown in FIG. 3. On a boosted engine, desired torque may also be maintained by adjusting wastegate and/or compressor bypass valves.

Referring now specifically to FIG. 3, an example engine 10 is shown with four in-line cylinders. In one embodiment, engine 10 may have a turbocharger 319, which has a turbine 319a coupled to the exhaust manifold 48 and a compressor 319b coupled to the intake manifold 44. While FIG. 3 does not show an intercooler, one may optionally be used. Turbine 319a is typically coupled to compressor 319b via a drive shaft 315. Various types of turbochargers and arrangements may be used. For example, a variable geometry turbocharger (VGT) may be used where the geometry of the turbine and/or compressor may be varied during engine operation by controller 12. Alternately, or in addition, a variable nozzle turbocharger (VNT) may be used when a variable area nozzle is placed upstream and/or downstream of the turbine in the exhaust line (and/or upstream or downstream of the compressor in the intake line) for varying the effective expansion or compression of gasses through the turbocharger. Still other approaches may be used for varying expansion in the exhaust, such as a waste gate valve. FIG. 3 shows an example bypass valve 320 around turbine 319a and an example bypass valve 322 around compressor 319b, where each valve may be controlled via controller 12. As noted above, the valves may be located within the turbine or compressor, or may be a variable nozzle.

Also, a twin turbocharger arrangement, and/or a sequential turbocharger arrangement, may be used if desired. In the case of multiple adjustable turbocharger and/or stages, it may be desirable to vary a relative amount of expansion though the turbocharger, depending on operating conditions (e.g. manifold pressure, airflow, engine speed, etc.). Further, a mechanically or electrically driven supercharger may be used, if desired.

Figure 4:
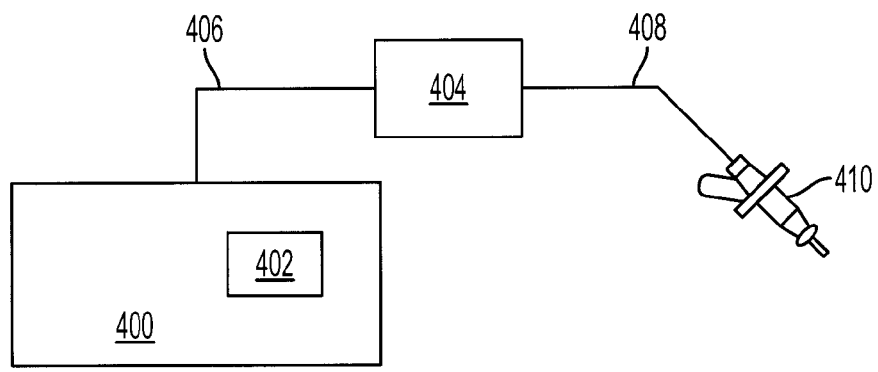
FIG. 4 shows example fuel tank and pump configurations.

Referring now to FIG. 4, an example fuel delivery system is shown for an example with a single injector, where the single injector is a direct injector. In this example, a fuel tank 400 is shown for holding a fuel, such as gasoline and an alcohol blend. The fuel tank has an internal fuel pump 402, where the internal fuel pump is a lower pressure fuel pump. A fuel pump 404 is coupled to the lower pressure fuel pump 402 by fuel rail 406, where the fuel pump is a higher pressure fuel pump. Higher pressure external fuel pump 404 is coupled to a fuel rail 406 having fuel injectors 410 coupled thereto. As noted herein, the fuel pressure at the injector may be adjusted by adjusting parameters such as the pump operation of one of pumps 402 and/or 404, for example.

Figure 5A:
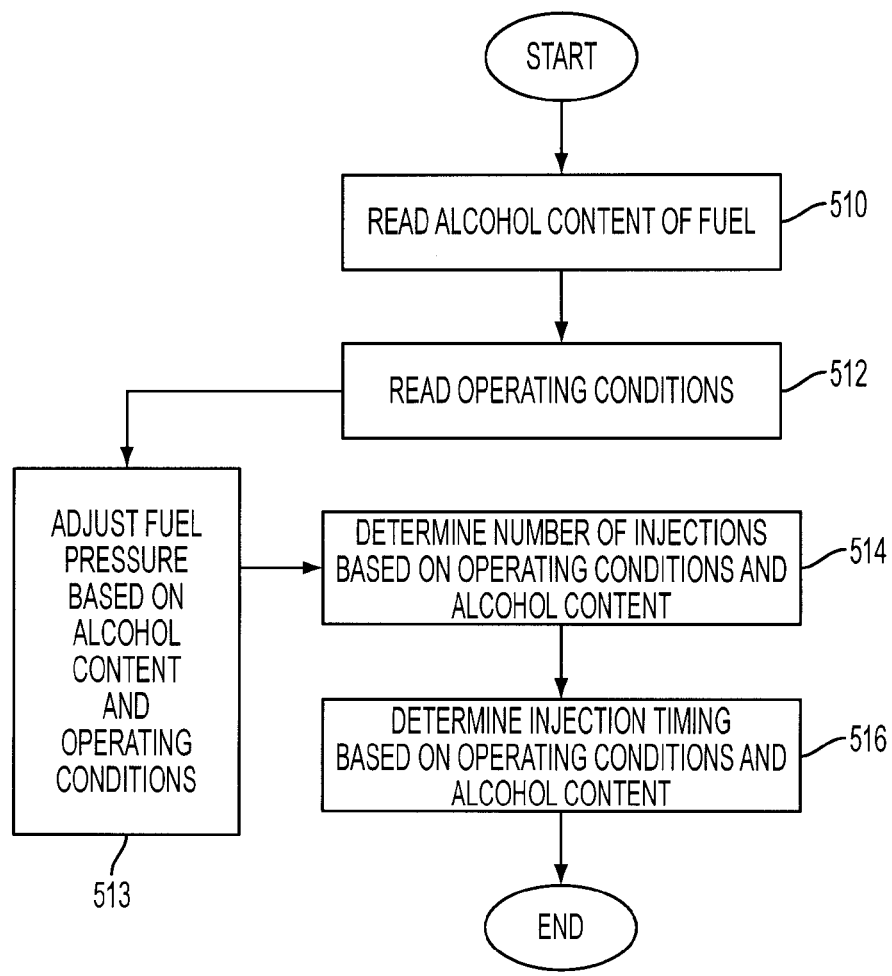
FIG. 5 shows a graph illustrating example injection timing operation.

Referring now to FIG. 5A, a routine is described for adjusting fuel injection parameters taking into account an amount of alcohol in the fuel system. In 510, the routine reads an alcohol content of the fuel. The alcohol content of the fuel may be a percent alcohol, mass ratio of alcohol, volume ratio of alcohol, an amount of oxygen in the fuel, or various other indications of an amount of alcohol in the fuel. The indication may be provided via an alcohol sensor, or may be generated from an estimate based on operating conditions, or combinations thereof. An estimate of alcohol content of the fuel may be formed using feedback from and exhaust gas sensor, in addition to other parameters, such as, for example, a mass airflow amount, a fuel injection pulse-width, a manifold pressure, and/or others.

Continuing with FIG. 5A, in 512, the routine reads other operating conditions that may be used to adjust fuel injection timings and/or amounts, such as, for example, engine coolant temperature, feedback from a knock sensor, cylinder air amount, manifold pressure, air charge temperature, manifold temperature, desired air-fuel ratio, spark timing, atmospheric pressure, and/or various other parameters.

Then, in 513, the routine determines whether to adjust, and if so does adjust, fuel injection pressure based on a desired engine output torque and engine speed given the alcohol content of the fuel. Because alcohols are partially oxygenated, (ethanol is $CH_5OH$, for example), they liberate a lesser amount of energy (lower heating value) when oxidized during combustion than a non-oxygenated hydrocarbon, like gasoline. The mass of fuel injected is increased as a function of alcohol content to provide the same combustion energy as gasoline, which requires a greater dynamic range from the fuel system. The pulse width may be adjusted to provide the desired amount of fuel. However, to handle a wide variety of fuels, including those with high alcohol content, the providing a greater amount of fuel by merely increasing the pulse width may be insufficient with the additional constraint of maintaining acceptable pulse-to-pulse repeatability at low fuel demand conditions. It is possible to address dynamic range issues with direct injection when alcohol content of the fuel varies by varying the fuel supply pressure with higher pressures at higher speed and/or torque conditions and lower pressures at lower speed and/or torque conditions.

Continuing with FIG. 5, in 514, the routine determines a number of injections per engine cycle to be performed based on conditions and the amount of alcohol in the fuel. For example, as the amount of alcohol in the fuel increases, a greater or lesser number of injections for a given operating condition (e.g., a given speed/load condition) may be selected. Also, in the case of multiple injections per power cycle, a greater fraction of fuel may injected in an earlier injection as alcohol content increases so that there is more time for vaporization.

Then, in 516, the routine determines an injection timing (or timings in the case of multiple injections per cycle) based on conditions and the alcohol amount of the fuel. For example, injection timing of one or more injections may be advanced with increased alcohol in the fuel to take advantage of higher latent enthalpy of vaporization of alcohol to allow more time for vaporization. In one example, the injection timing may be advanced as a function of alcohol content and also the nature of the alcohol (e.g., ethanol vs. methanol). More injection timing advance may be used for methanol than ethanol because of its relatively higher latent enthalpy of vaporization, for example. Also, the timing of the injections may be adjusted based on the number of injections. In another example, injection timing may be advanced toward the period where there is pushback into the intake as a function of alcohol content. In this way, vaporization of the alcohol fuel can be aided by passing by the intake valve (twice, out and in). By cooling the intake system in this way, the charge density rammed into the combustion chamber can be increased thereby improving peak torque output of the engine. As such, injection timing may be adjusted based on engine torque and alcohol content to improve engine output.

Note that other engine control adjustments may be made based on alcohol content of the fuel, such as spark timing, boosting, and/or various others. In one example, the controller may increase boost on a variable geometry turbocharger (or via wastegate control) as a function of the increased octane in fuel due to the alcohol content. Due to direct injection into the cylinder, the cooling effect of the vaporization of the fuel occurs in the cylinder. This can increase the cooling compared to port injection and allows a greater boost without incurring knock.

In another example, the controller may adjust valve timing to increase valve overlap and inject fuel having alcohol at least partially during the valve overlap period to enhance the charge cooling effect with increased alcohol in the fuel. For example, intake valve timing may be advanced and/or exhaust valve timing may be retarded. An example of such operation is shown in the last graph of FIG. 5B, for example.

Further still, ignition timing and/or valve timing may also be adjusted in response to an alcohol amount of the fuel.

Figure 5B:
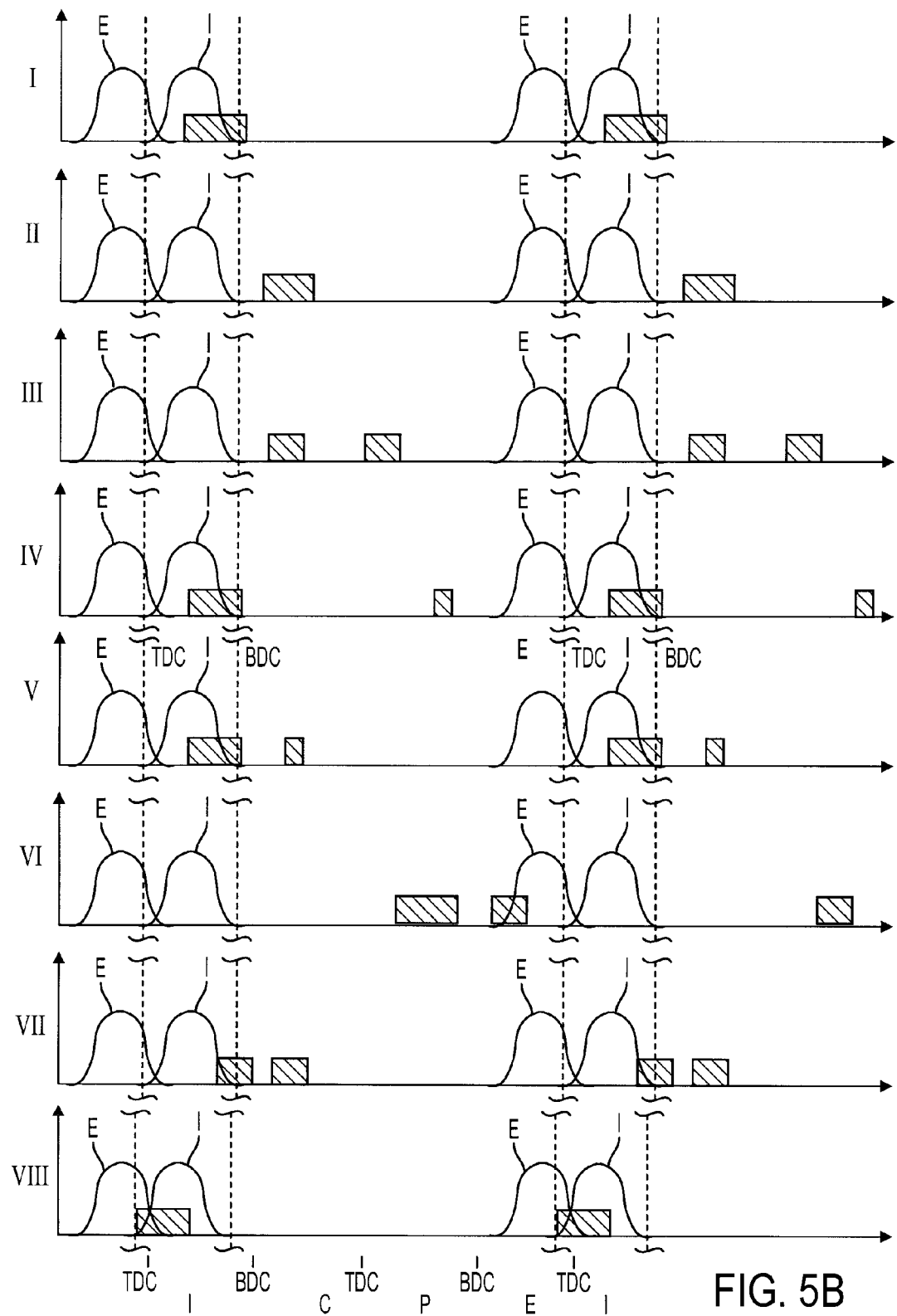

Various examples of variable injection timing and number of injections per cycle are illustrated in FIG. 5B, where the dashed vertical lines indicate intake valve opening and intake valve closing. Various parameters may affect the adjustments shown between the graphs of FIG. 5B, as noted herein, including an alcohol amount of the fuel and/or other operating parameters such as alcohol type, fuel injection timing, and number of fuel injection pulses, fuel injection supply pressure, boosting, knock detection, temperature, engine starting, or others.

In the first graph (A), a single injection is shown occurring partially during the intake stroke and ending after the close of the intake valve. The injection occurs partially during an open intake valve. In this example, the injection is advanced compared to the injection timing in the second graph (B), which shows both a shorter duration of fuel injection, and a later timing during a compression stroke. The shorter duration may be to compensate for an increased power density and lower alcohol content, for example. The third graph (C) shows multiple injections (two) during the cycle, both during the compression stroke. However, based on alcohol content and/or other parameters, injections may occur during the intake stroke as well as shown by the fourth graph. Further, as shown by comparing the third and fourth graph (D), the relative amount of the injections may be adjusted based on alcohol content of the fuel and/or other parameters. Also, the fifth graph (E) illustrates that changes in alcohol content of the fuel can affect the duration between injections as well.

The sixth graph (F) illustrates that operating conditions such as alcohol content can affect late timing and/or fuel injection amounts, as shown by the exhaust stroke injection. Likewise, the seventh graph (G) illustrates another example of variable timing, relative amounts of injection, and timing between injections, being varied in response to parameters such as alcohol content of the fuel.

Finally, the last graph (H) illustrates injection timing using pushback effects with valve overlap. As noted above, such operation may be used to further take advantage of charge cooling/vaporization effects with increased alcohol content in the fuel to increase torque of the engine while reducing knock effects.

Note that the control routines included herein can be used with various engine configurations, such as those described above. The specific routine described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 12.

It will be appreciated that the configurations and routines disclosed herein are exemplary in nature, and that these specific embodiments are not to be considered in a limiting sense, because numerous variations are possible. For example, the above technology can be applied to V-6, I-4, I-5, I-6, V-8, V-10, V-12, opposed 4, and other engine types. Also, while various examples are applied to engines with variable boosting, the approaches can be applied to non-boosted engines as well. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

I claim:

1. A method to control injection timing for an internal combustion engine having a plurality of injectors in at least a cylinder, the method comprising:
   directly injecting a fuel to at least a cylinder of an internal combustion engine; and
   adjusting a timing and number of injections as an alcohol amount in the fuel varies.

2. The method of claim 1 further comprising adjusting a fuel injection pressure as said alcohol amount in the fuel varies.

3. The method of claim 1 wherein said adjusting is further based on engine load and engine temperature.

4. The method of claim 3 further comprising adjusting a spark timing based on said alcohol amount.

5. The method of claim 4 further comprising adjusting a boost amount based on said alcohol amount.

6. The method of claim 1 wherein said adjusting includes advancing injection timing as said alcohol amount increases.

7. The method of claim 1 wherein said adjusting includes increasing a number of injections as said alcohol amount increases.

8. The method of claim 6 wherein said adjusting includes advancing injection timing including injecting said fuel at least partially during an intake and exhaust valve overlap condition and starting said injection before a piston in the cylinder reaches top dead center of its exhaust stroke.

9. The method of claim 1 further comprising adjusting a spark timing based on said alcohol amount.

10. The method of claim 1 further comprising adjusting a spark timing based on an amount of water inducted into the cylinder.

11. A method to control injection timing for an internal combustion engine having a cylinder, the method comprising:
    directly injecting a fuel to at least a cylinder of an internal combustion engine via a direct injector coupled to the cylinder; and
    advancing a timing of said injection as an alcohol amount in the fuel increases for a given engine operating condition.

12. The method of claim 11 wherein during at least one condition, said fuel is directly injected at least partially during an intake and exhaust valve overlap condition.

13. The method of claim 12 further comprising boosting said engine, where an amount of boost is varied as said alcohol amount varies.

14. The method of claim 13 further comprising adjusting an ignition timing in response to said alcohol amount.

15. The method of claim 13 further comprising adjusting valve timing in response to said alcohol amount.

16. The method of claim 13 further comprising adjusting a number of injections during a cylinder cycle in response to said alcohol amount.

17. The method of claim 13 further comprising adjusting a spark timing based on an amount of water inducted into the cylinder.

18. A method to control injection timing for an internal combustion engine having a cylinder, the method comprising:
    adjusting valve timing of cylinder valves of the cylinder to generate intake and exhaust valve overlap;
    directly injecting a fuel to at least a cylinder of an internal combustion engine via a direct injector coupled to the cylinder; and
    adjusting a timing of said injection to inject said fuel at least partially during the valve overlap, where said timing occurs earlier when said fuel has a higher alcohol amount and occurs later when said fuel has a lower alcohol amount.

19. The method of claim 18 further comprising advancing a spark timing when said fuel has a higher alcohol amount.

20. The method of claim 18 further comprising advancing a spark timing when a greater amount of water is inducted into the cylinder.

* * * * *